(12) United States Patent
Shenoy et al.

(10) Patent No.: US 12,360,673 B1
(45) Date of Patent: Jul. 15, 2025

(54) DATA STORAGE DEVICE AND METHOD FOR GARBAGE COLLECTION IN A MULTI-TIER MEMORY

(71) Applicant: SanDisk Technologies LLC, Austin, TX (US)

(72) Inventors: Manoj M. Shenoy, Ernakulam (IN); Ramanathan Muthiah, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/676,929

(22) Filed: May 29, 2024

(51) Int. Cl.
 *G06F 3/06* (2006.01)
(52) U.S. Cl.
 CPC .............. *G06F 3/061* (2013.01); *G06F 3/064* (2013.01); *G06F 3/0679* (2013.01)
(58) Field of Classification Search
 None
 See application file for complete search history.

(56) References Cited

U.S. PATENT DOCUMENTS

| 10,157,680 | B2 | 12/2018 | Yang et al. | |
| 11,269,767 | B2* | 3/2022 | Byun | G06F 3/0679 |
| 2015/0370701 | A1* | 12/2015 | Higgins | G06F 12/0246 711/103 |
| 2016/0267004 | A1* | 9/2016 | Perlstein | G06F 12/0253 |
| 2019/0286556 | A1* | 9/2019 | You | G06F 12/0246 |
| 2024/0069789 | A1* | 2/2024 | Oh | G06F 12/0253 |
| 2025/0094078 | A1* | 3/2025 | Oh | G06F 12/0253 |

* cited by examiner

*Primary Examiner* — Kevin Verbrugge
(74) *Attorney, Agent, or Firm* — Crowell & Moring LLP

(57) ABSTRACT

A multi-tier memory comprises a block of memory with a plurality of sub-blocks (e.g., three sub-blocks). A garbage collection operation that chooses a source block based on a valid fragment count may not be suitable in multi-tier memories where sub-blocks have a dependency on one another (e.g., for an erase or program operation). The embodiments presented herein provide various garbage collection techniques that can be used in this situation. The techniques described herein can take in to account the valid fragment count of various sub-block groupings when deciding where to perform a garbage collection operation.

20 Claims, 11 Drawing Sheets

DATA STORAGE DEVICE AND METHOD FOR GARBAGE COLLECTION IN A MULTI-TIER MEMORY

BACKGROUND

A memory in a data storage device can comprise a plurality of blocks of memory cells. In some data storage devices, a block of memory can be partitioned into two or more sub-blocks, where each sub-block is independent of the other sub-blocks. A memory having multiple sub-blocks is sometimes referred to as a multi-tier memory.

DETAILED DESCRIPTION

The following embodiments generally relate to a data storage device and method for garbage collection in a multi-tier memory. In one embodiment, a data storage device is provided comprising a memory comprising a plurality of blocks, each block configured to be partitioned into a plurality of sub-blocks, and one or more processors. The one or more processors, individually or in combination, are configured to: determine a sum of valid fragment counts of a first grouping of sub-blocks; determine a sum of valid fragment counts of a second grouping of sub-blocks; determine which of the first and second groupings of sub-blocks has a lesser sum of valid fragment counts; and perform garbage collection on whichever of the first and second groupings of sub-blocks that is determined to have the lesser sum of valid fragment counts.

In another embodiment, a method is provided that is performed in a data storage device comprising a memory comprising a plurality of blocks, each block configured to be partitioned into a plurality of sub-blocks. The method comprises: for each block of the plurality of blocks, determining a sum of valid fragment counts of the plurality of sub-blocks in that block; determining which block of the plurality of blocks has the lowest sum of valid fragment counts; determining a sum of valid fragment counts of each of a plurality of sub-block groupings in the block of the plurality of blocks determined to have the lowest sum of valid fragment counts; determining which sub-block grouping of the plurality of sub-block groupings has a lowest sum of valid fragment counts; and performing garbage collection on the determined sub-block grouping.

In yet another embodiment, a data storage device is provided comprising: a memory comprising a block configured to be partitioned into upper, middle, and lower sub-blocks; and means for: performing garbage collection on whichever of the upper sub-block and the lower sub-block that has a greater valid fragment count; and grouping the middle sub-block with whichever of the upper sub-block and the lower sub-block that does not have the greater valid fragment count, wherein the grouping competes with other sub-block groupings and individual sub-blocks in the memory for a future garbage collection operation.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1A:
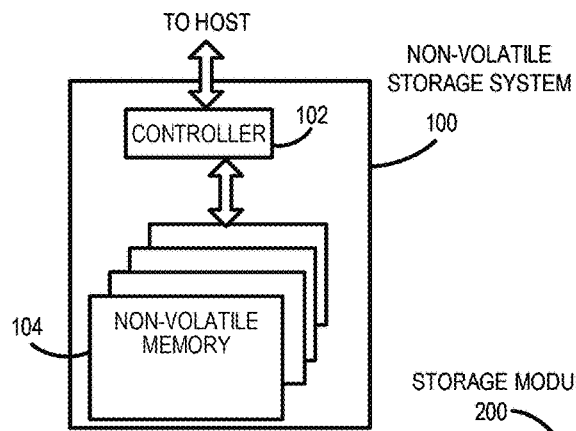
FIG. 1A is a block diagram of a data storage device of an embodiment.
Figure 1B:
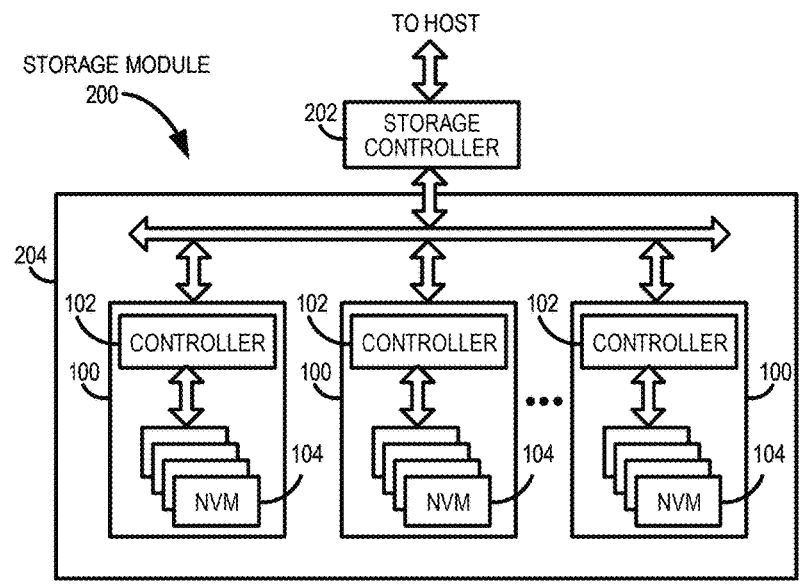
FIG. 1B is a block diagram illustrating a storage module of an embodiment.
Figure 1C:
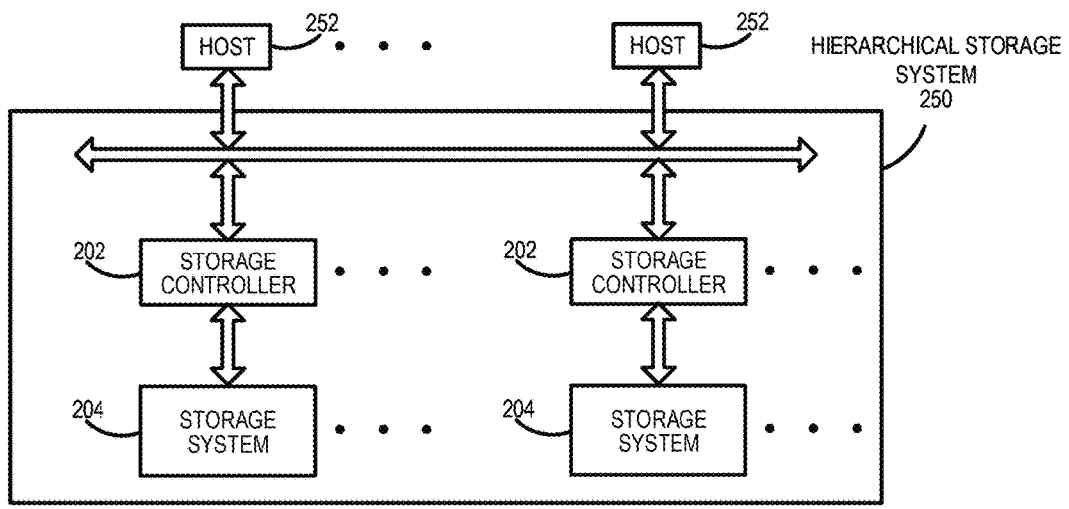
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
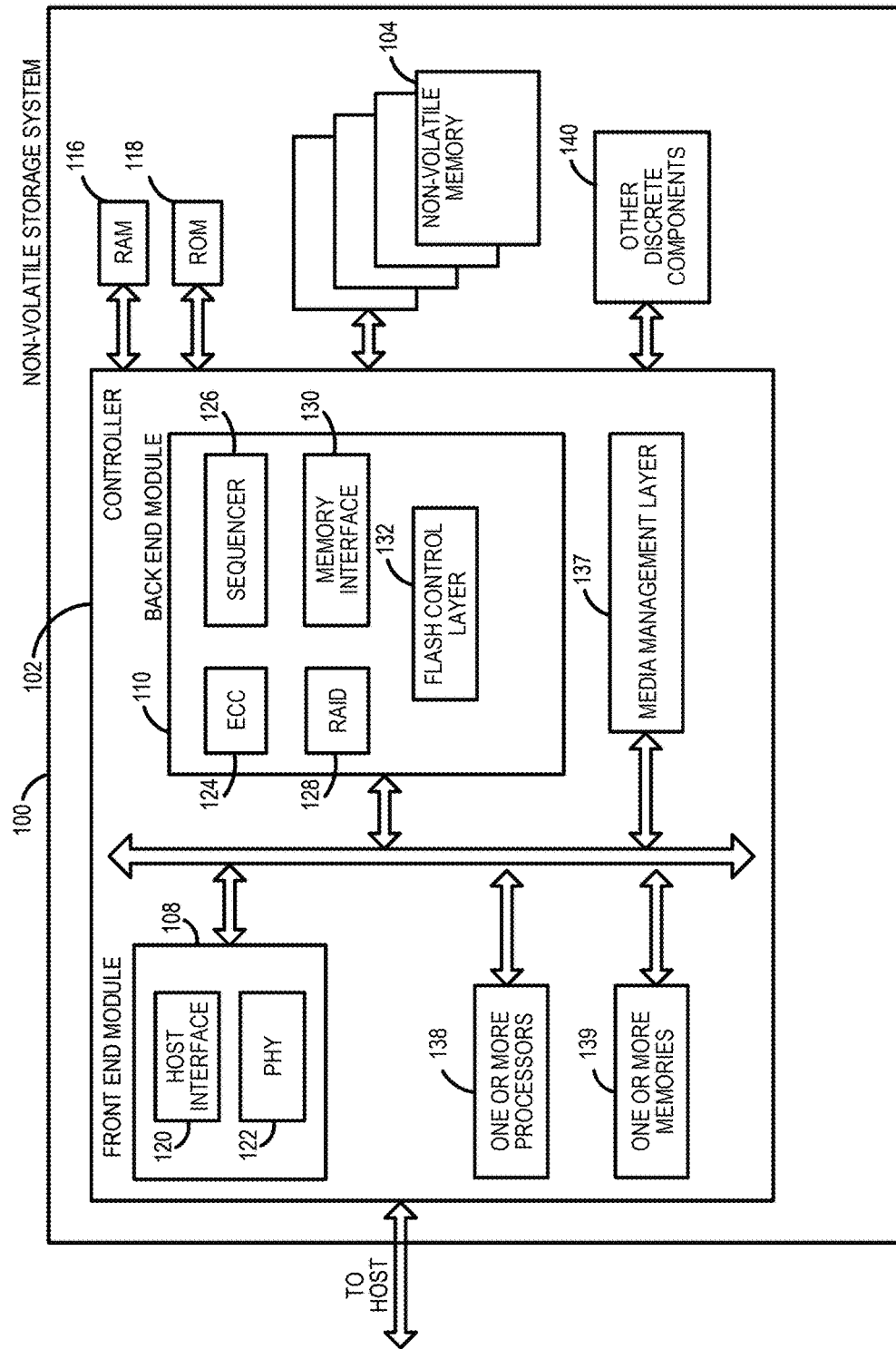
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface.

The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
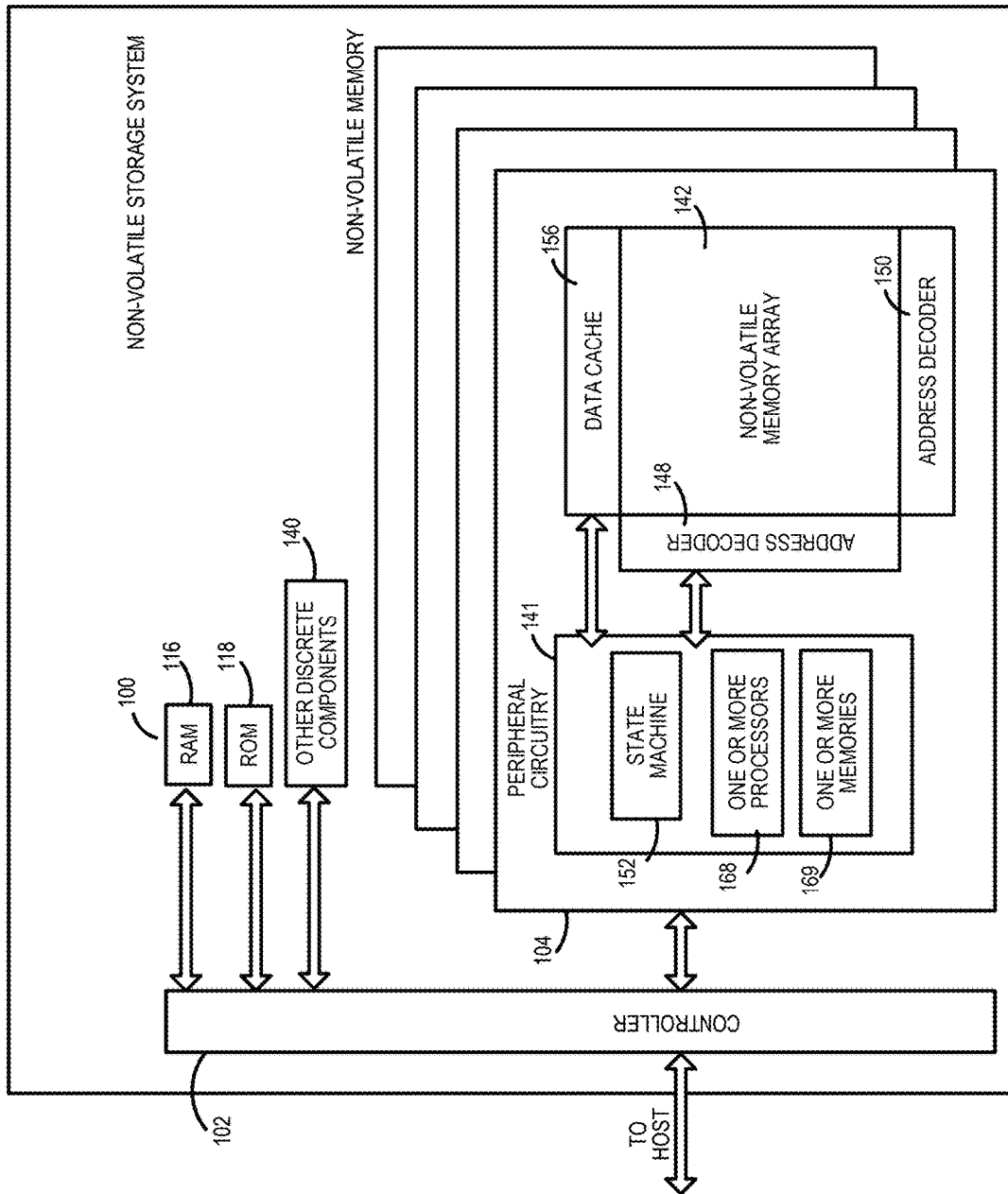
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
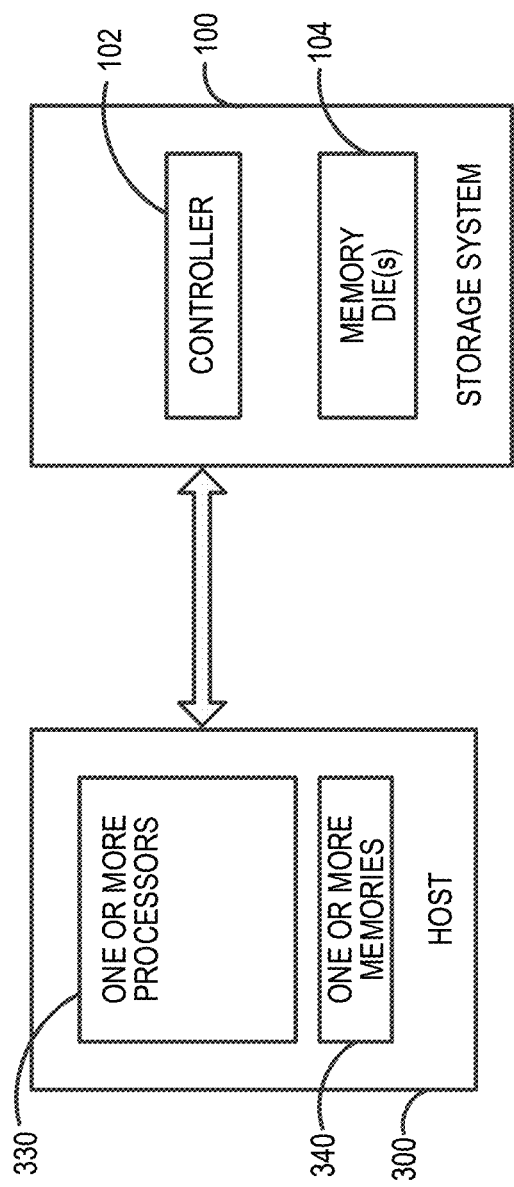
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

BICS/3D NAND shows an ever-increasing trend for large block sizes to provide cost reduction and a non-breakable vertical stack. However, from the data storage device's perspective, a large block size may not be desirable. For example, with large block sizes, the number of blocks get reduced, which can affect the block budget of the data storage device to meet capacity and management. A large block size can also make internal transfers much slower. Further, if one wordline is defective in a normal block, the block can still operate as a partial block. So, more blocks can provide more "good blocks" to assist in yield recovery. Thus, there may be a desire to reduce block size. Sub-block mode (SBM) can be used to address this desire and is described in U.S. Pat. No. 10,157,680, which is hereby incorporated by reference. The following paragraph provide a general overview of sub-block mode.

In one embodiment, the memory 104, which can include one or more memory dies, comprises a plurality of blocks of memory. In an embodiment that uses a three-dimensional memory, a block of memory can comprise a plurality of memory cells located in a single x-y location on a silicon die but in a plurality of z locations. A block of memory can be partitioned (e.g., by the controller 102) into a plurality of sub-blocks, where each sub-block occupies the single x-y location but is located in a different z location. In a BiCS architecture, the plurality of sub-blocks (sometimes referred to as "tiers" or "partial blocks") can be connected vertically to the same memory hole. Each sub-block in a block can have its own wordline zone. The data storage device 100 can be referred to as operating in "sub-block mode (SBM)" when a block is partitioned into two or more sub-blocks. A memory that is partitioned this way can be referred to as a "multi-tier memory." In sub-block mode, each of the sub-blocks is completely independent of the other sub-blocks in the block. Sub-block mode can be used with any suitable type of memory, such as, but not limited to, BiCS4/5/6/8 technology implemented in a user SLC mode.

Figure 4:
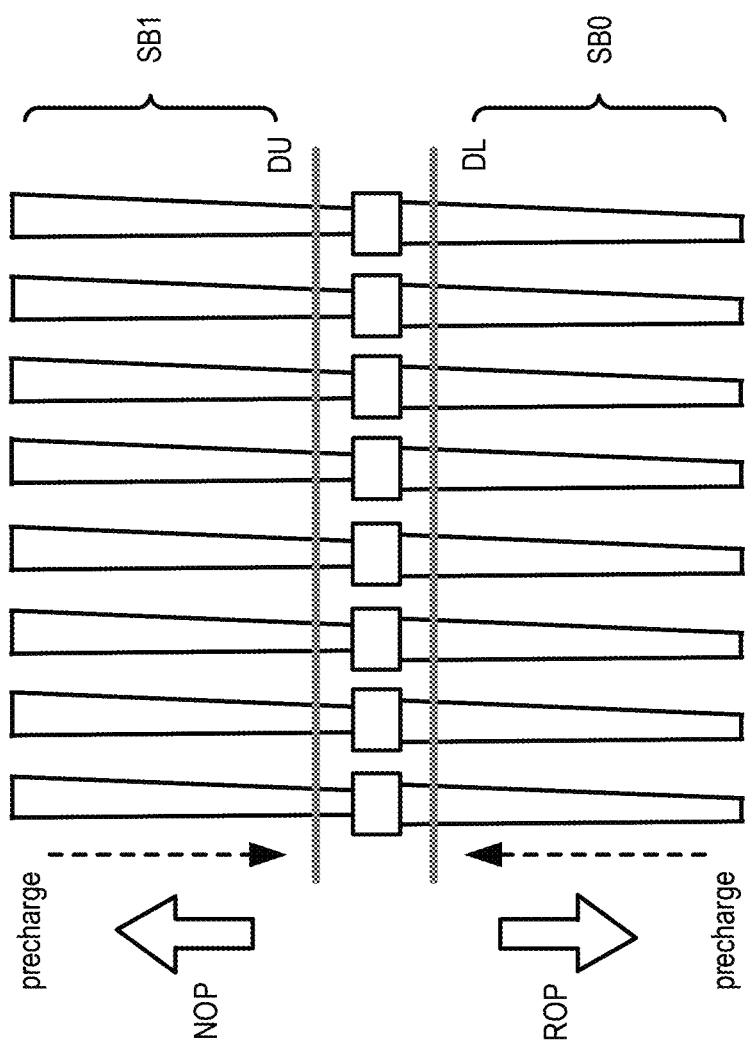
FIG. 4 is a diagram of a block of memory of an embodiment partitioned into two sub-blocks.

In one embodiment (shown in FIG. 4), a block is partitioned into two sub-blocks: sub-block 0 (SB0) and sub-block 1 (SB1). In this embodiment, a physical two-tier structure is used, where the joint structure serves as a natural separation for the upper logical sub-block and the lower logical sub-block. As shown in FIG. 4, in this embodiment, the upper sub-block is programmed using a "normal order program (NOP)" where pre-charge is allowed from the drain side, and the lower sub-block is programmed using "reverse order program (ROP)" where pre-charge relies on the source side.

Figure 5:
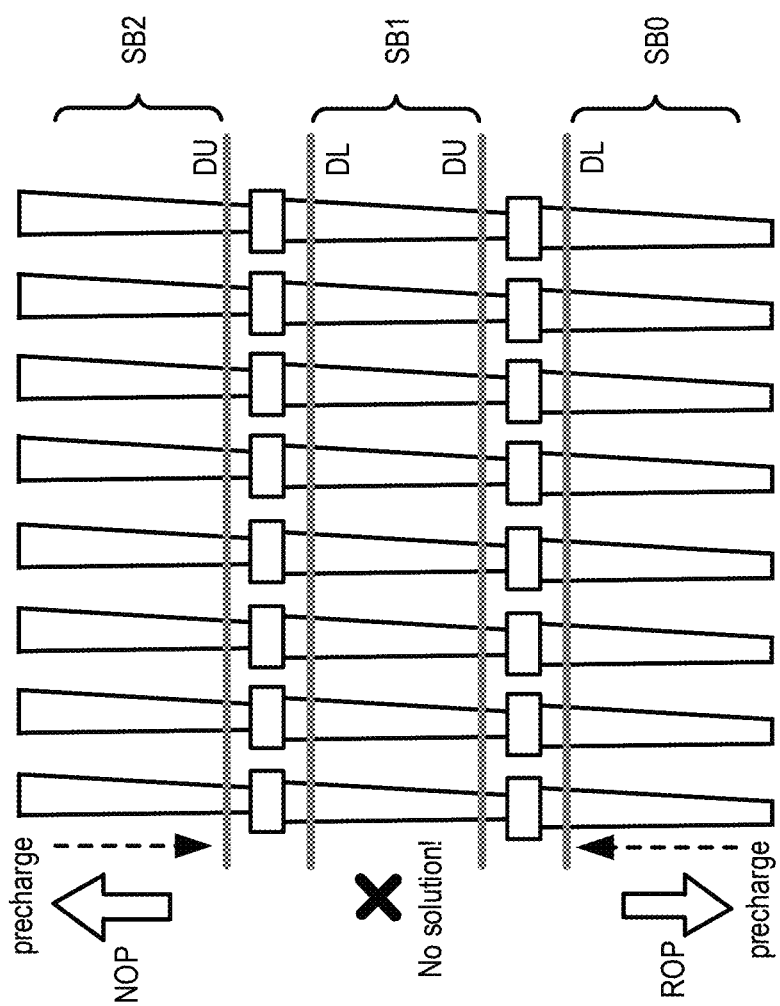
FIG. 5 is a diagram of a block of memory of an embodiment partitioned into three sub-blocks.

Due to memory hole etching process limitations, BiCS9 and beyond may not be able to use a two-tier structure, and a physical three-tier structure may be needed. So, the existing two sub-block solution may not be suitable in the three-tier structure if the middle tier cannot be pre-charged from the source/drain side. In this situation, a severe program disturb can prevent the use of the two sub-block mode design. However, since block sizes are increasing and the number of blocks is being reduced generation by generation, the block budget can be a concern for the data storage device. Hence, usage of a three-tier sub-block mode may be required to extend the current two-tier sub-block mode design to increase the number of blocks. However, in a three-tier sub-block mode, the middle block can have an erase/program dependency on its neighbors, as illustrated in FIG. 5.

Garbage collection in the controller's firmware internal operation may also need to be managed in the three-tier sub-block mode as there may be limitations on the programming order of the sub-blocks. Typically, garbage collection is done based on the valid fragment count (VFC) in each of the blocks. If the VFC is less than a threshold, the controller of the data storage device chooses that block as a garbage collection source block candidate since there is less work to do to get a block freed up. This method will work if the metablocks (e.g., a collection of blocks across a plurality of memory dies) are independent of each other. This is the case in a two-tier sub-block structure since both sub-blocks are independent of each other. However, when a metablock has a dependency on other metablocks for an erase operation, the garbage collection method discussed above may not work owing to the restriction on the memory regarding erase and program, as discussed above regarding the pre-charge problem.

The following embodiments can be used to address this situation of garbage collection in multi-tier memories (e.g., three tiers or more) where a block erase or program has a dependency on another block. These embodiments present multiple solutions based on whether or not there is a disturbance from one sub-block to its neighboring sub-block(s) during various memory activities, which can be part of NAND characterization work for the multi-tier BiCS memory. This disturbance is referred to herein as an unselected sub-block disturb (USBD). USBD is an error created by a voltage shift in one sub-block after another sub-block has been programmed and erased more than a threshold number of times (e.g., more than a threshold number of program-erase cycles).

As noted above, one embodiment is directed to garbage collection without the USBD limitation, and another embodiment is directed to garbage collection with the USBD limitation. In discussing these embodiments, the following naming convention will be used where there are three sub-blocks. "Upper pair" refers to a pair of sub-blocks logically referring to upper and middle sub-blocks. "Lower pair" refers to a pair of sub-blocks logically referring to lower and middle sub-blocks. A "block" refers to all of the sub-blocks of that block. Upper page valid fragment count (VFC) is equal to the VFC of the upper sub-block plus VFC of the middle sub-block. Lower pair VFC is equal to the VFC of the lower sub-block plus the VFC of the middle sub-block. The total VFC is equal to the VFC of the lower sub-block plus the VFC of the middle sub-block plus the VFC of the upper sub-block.

As mentioned above, this embodiment relates to a garbage collection flow for a data storage device with no USBD limitations in sub-block memory. In this embodiment, the controller 102 of the data storage device 100 creates a logical sub-block pairing. The controller 102 sums the individual valid fragment count (VFC) of the upper sub-block pair and the lower sub-block pair in each block to determine the aggregated VFC of both the upper and lower sub-block pairs of that sub-block. The controller 102 then chooses a victim sub-block pair whose VFC is the least among the plurality of multiple pairs across multiple blocks that are eligible for garbage collection when it determines to choose a victim source block for garbage collection in the situation of no USBD limitations.

The controller 102 chooses a pair that specifically includes the middle block since the middle block has an erase/write dependency, rather than choosing just a single sub-block. Since there is no USBD limitation in this situation, the sub-blocks can be independently used (with independent program-erase count (PEC) cycles across each sub-block). Hence, there is no obligation for the controller 102 to specially handle the leftover sub-block right away. In other words, once the pair is chosen for garbage collection, the leftover sub-block competes for garbage collection independently with the rest of the pairs of sub-blocks and individual sub-blocks. This method can result in out-of-sync PEC across sub-blocks across the memory 104, which is not an issue with memories without a USBD limitation.

An alternative method in the "no USBD limitation" situation is to choose either of an upper or lower sub-block of blocks among the plurality of multiple blocks with the least VFC as a victim source block, and pair the other sub-block with the middle sub-block as a leftover pair, such that the sub-block pair can compete subsequently with the rest of the sub-blocks (individual sub-blocks and the sub-block pairs) for garbage collection source blocks. In this case, the middle sub-block is not necessarily picked as a priority block. However, it holds onto its neighboring sub-block (its pair, upper or lower sub-block) for erase/program for subsequent garbage collection on the pair, thereby allowing more time for the data to get automatically invalidated in the pair leading to less garbage collection overhead. This method may be desired if the VFC of the middle sub-block is high, as by postponing garbage collection on the leftover pair, the controller 102 can gain from auto-invalidations in the sub-block pair.

Figure 6:
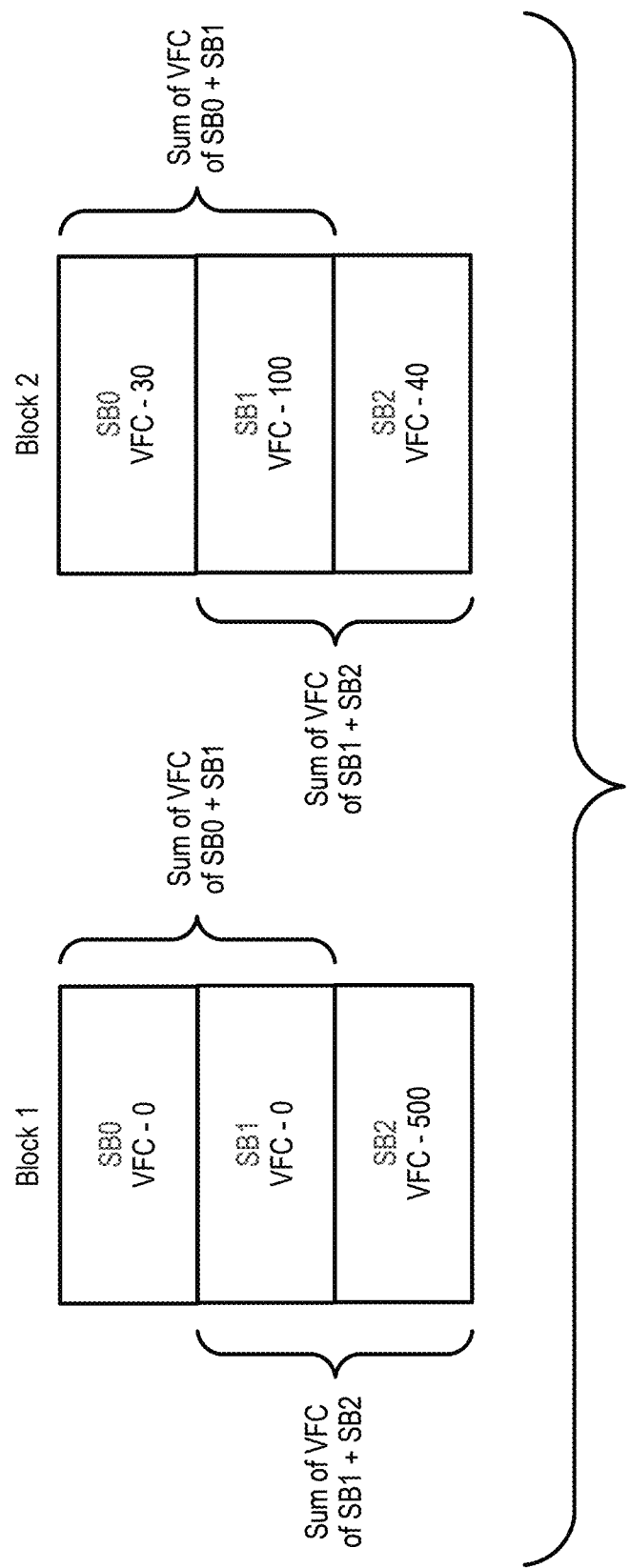
FIG. 6 is an illustration of two blocks of memory of an embodiment.
Figure 7:
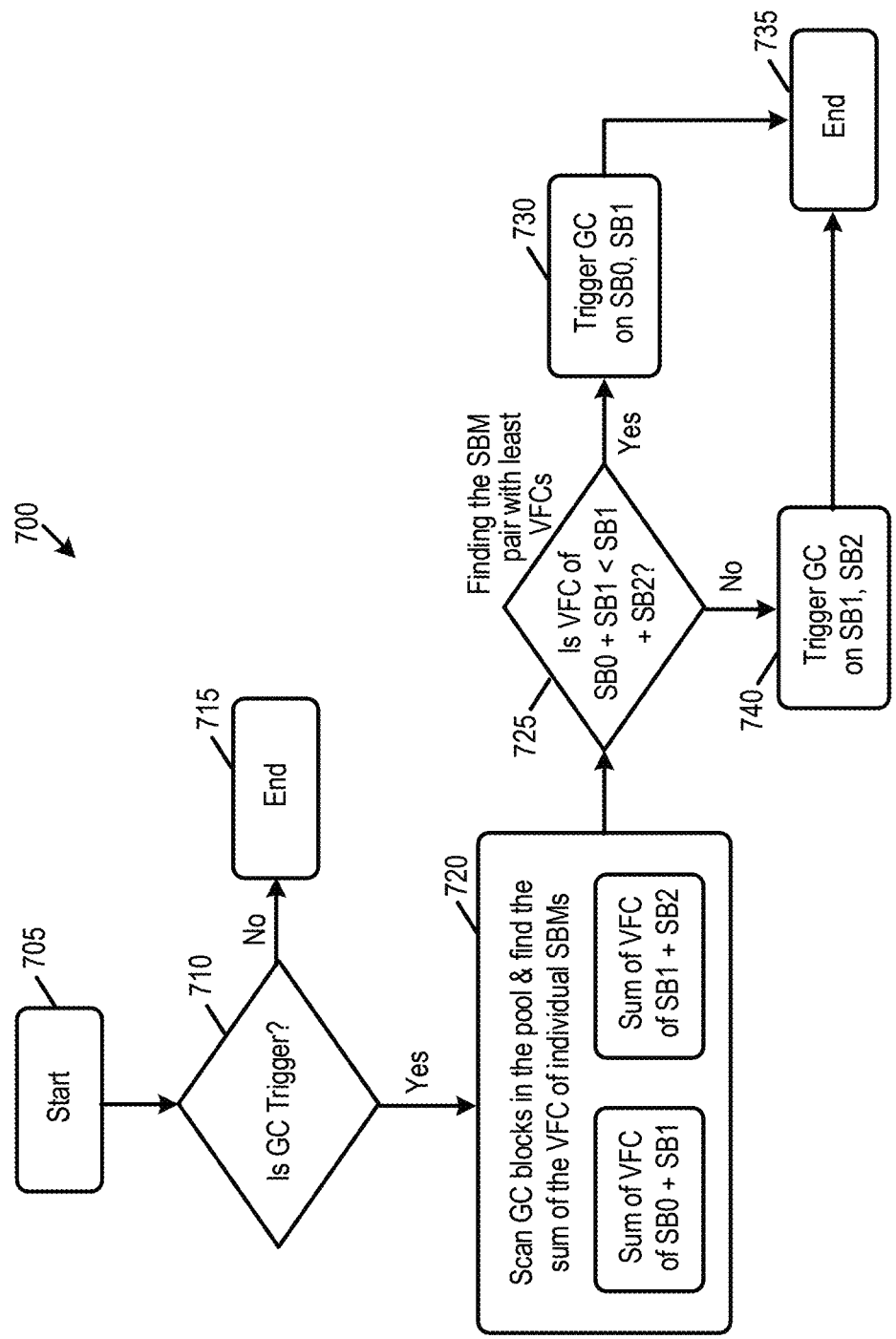
FIG. 7 is a flow chart of a method of an embodiment for garbage collection in a multi-tier memory.

FIGS. 6 and 7 will now be used to illustrate an example of this embodiment. As mentioned above, this embodiment can be used for memories where USBD issue is not present (e.g., when the data storage device 100 is capable of handling up to 100K USBDs), so complex wear level logic is not needed within the sub-blocks. In this example, the garbage collection block is picked in order per the following criteria.

First, the controller 102 scans garbage collection blocks in a pool and finds the sum of the VFCs of individual sub-blocks. In the example shown in FIG. 6, Block 1 and Block 2 have respective VFC in their sub-blocks. In this example, all of the blocks are logical metablocks. That is, SB0 is a metablock that is formed from interleaving many SB0 physical blocks across memory dies. For simplicity, instead of die interleaving, they are shown as a single block in FIG. 6. Also, there can be many eligible metablocks for garbage collection, but only two are shown in FIG. 6 for simplicity.

Second, the controller 102 compares the sum of VFC (upper plus middle sub-block, and middle plus bottom sub-block) and triggers garbage collection as a pair on the sub-block that has the smallest sum. In this example, this is the upper pair in Block 1.

FIG. 7 is a flow chart 700 of a method of an embodiment for garbage collection in a multi-tier memory. After the start (700) of the method, the controller 102 of the data storage device 100 determines if garbage collection is triggered (710). If garbage collection is not triggered, the method ends (715). If garbage collection is triggered, the controller 102 scans the garbage collection blocks in the pool and finds the sum of the VFCs of the individual sub-blocks, including the sum of various sub-block grouping/pairs (725). The controller 102 then determines which sub-block grouping has the lower sum of VFCs (725) and triggers garbage collection on the grouping with the lower sum (730, 740), after which the method ends (735).

As mentioned above, there are multiple ways to effectively make use of a multi-tier sub-block scheme for efficiently balancing the garbage collection. The above embodiment deals with the situation where the USBD issue is not present, and the following embodiment deals with the situation where the USBD issue is present. In this embodiment, wear level logic is present in the sub-blocks. In this embodiment where the USBD limitation is present, the controller 102 evaluates the total VFC (upper VFC plus middle VFC plus lower VFC of the sub-block) of each of the blocks eligible for garbage collection, picks a block with least total VFC, and chooses a sub-block pair in that block. Whichever pair's VFC is also least (minimum of the upper and lower pairs) can be chosen as a source pair of blocks for garbage collection when the controller 102 determines to choose a victim block in a product that has USBD memory limitations. The controller 102 may optionally choose the leftover sub-block as the immediate next candidate for the garbage collection source selection after the sub-block pair (chosen previously) associated with that block to maintain PEC sync between the sub-block. This way, all the sub-blocks of the block are closely tied to garbage collection count, thereby maintaining the PEC sync between the sub-blocks of a block. The initial check of total VFC and going by the least VFC ensures that the whole block is considered for VFC, which allows PEC sync alongside minimal write amplification.

In an alternative method, once the controller 102 has chosen a metablock based on total VFC (as above), instead of starting with a pair, the controller 102 can start with the upper or lower sub-block that has the least VFC in the block with least total VFC, followed by performing garbage collection on the leftover pair of that block. Following up with the left-over pair can be immediate or within a threshold if the PEC is in sync between the blocks. The threshold can be based on the USBD design criteria.

Although, each of the sub-blocks participates in independent metablock formation, the controller 102 can additionally treat all the metablocks associated with different sub-blocks of a block for one endurance purposes. That is, if the metablock (jumbo or a simply logical block) formed out of upper sub-blocks is used for hot data, the metablock formed out of the middle as well as the bottom sub-block can also be used for hot data or similar data types since all the sub-blocks of a block get into a situation to be erased at a similar frequency. This way, the impact that the middle metablock has a dependency on either the top or lower metablock for an erase is minimized. The program-erase (PE) of these metablocks can also move along together, which can be a requirement for management of sub-blocks with a USBD limitation.

Figure 8:
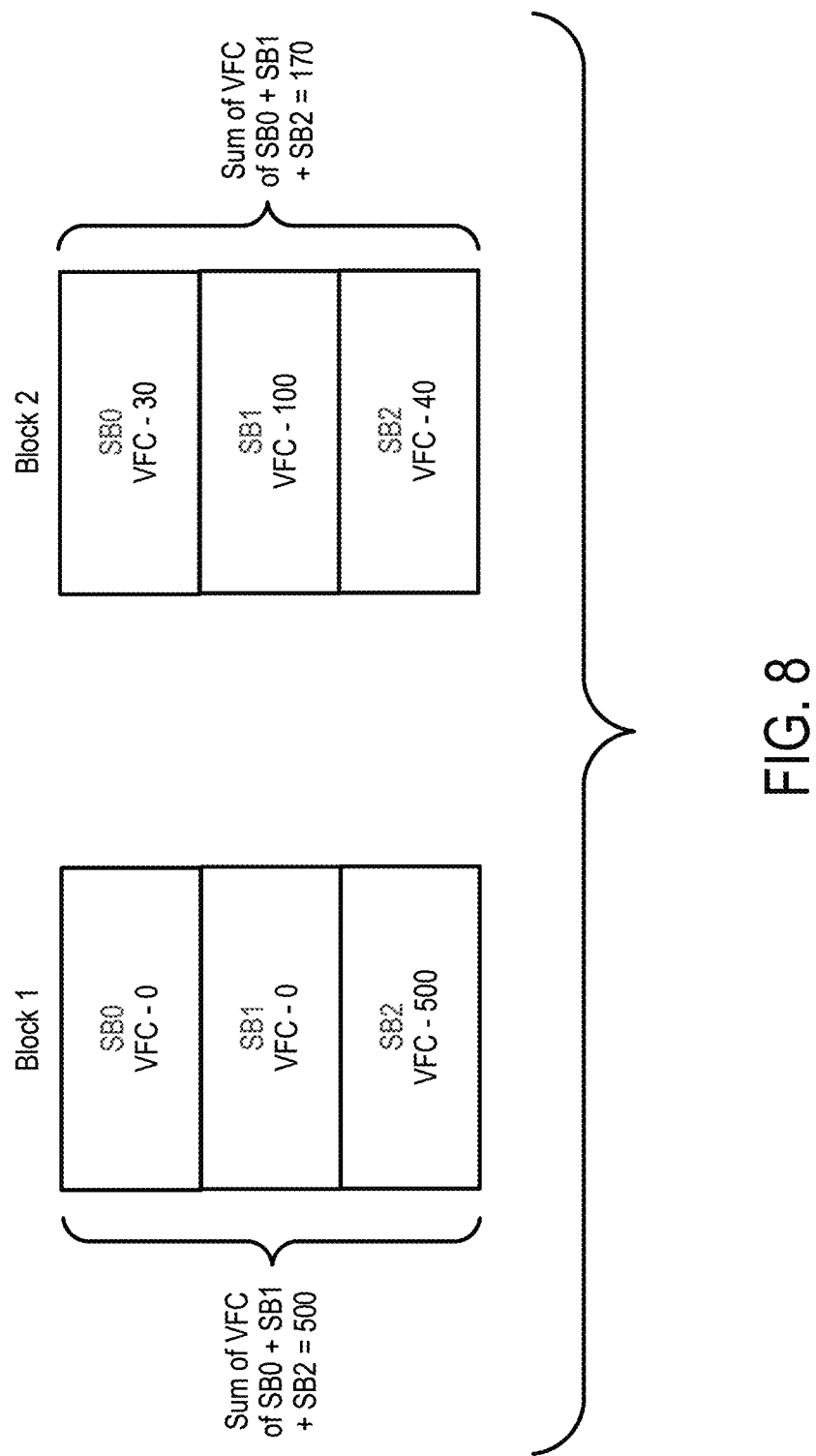
FIG. 8 is an illustration of two blocks of memory of an embodiment.
Figure 9:
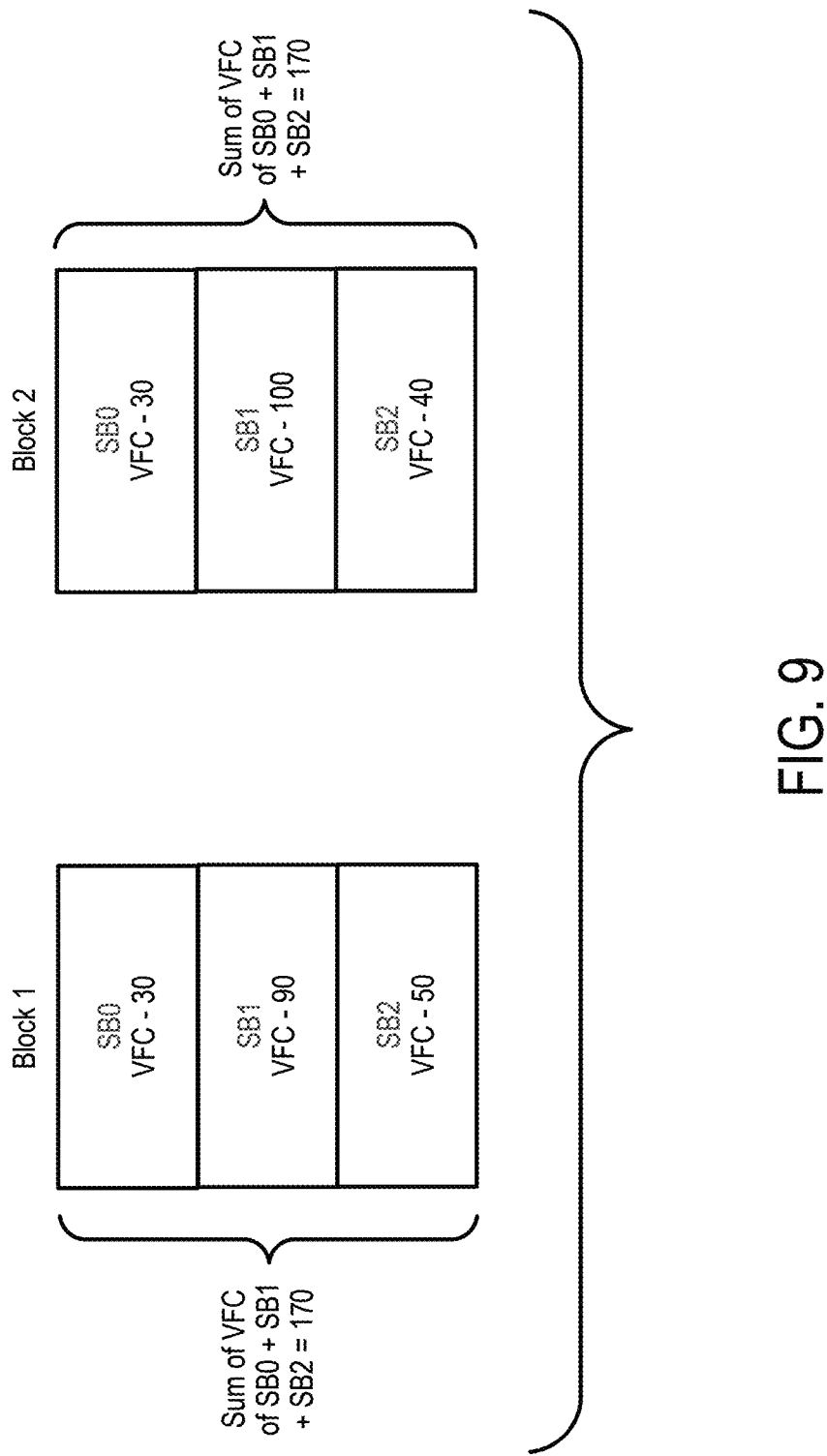
FIG. 9 is an illustration of two blocks of memory of an embodiment.
Figure 10:
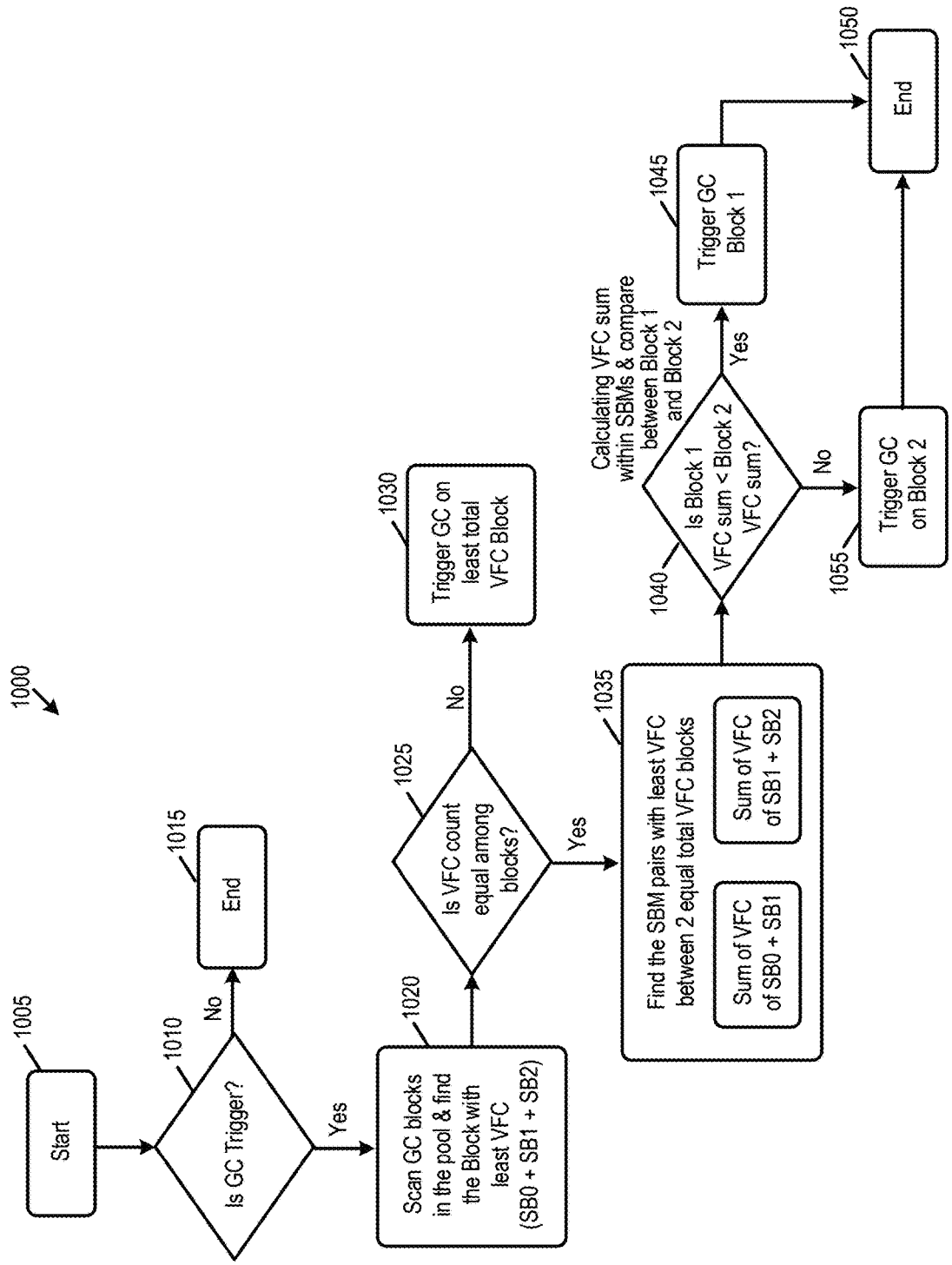
FIG. 10 is a flow chart of a method of an embodiment for garbage collection in a multi-tier memory.

FIGS. 8-10 will now be used to illustrate an example of this embodiment. As mentioned above, this embodiment can be used for memories where the USBD issue is present and wear level logic is used in the sub-blocks. In this example, the garbage collection block is picked in order per the following criteria. First, the controller 102 of the data storage device scans garbage collection blocks in the eligible pool and finds the block with least VFC (e.g., the VFCs of SB0+SB1+SB2). In the example shown in FIG. 8, Block 1 has a VFC total of 500 and Block 2 has a VFC total of 170. In this example, garbage collection will be triggered in Block 2. The controller 102 then triggers garbage collection on the sub-block with the lowest VFC.

If there are blocks with equal VFCs, the controller 102 can compare the sum of the VFCs within (Upper+Middle and Middle+Lower) and trigger garbage collection on the sub-block that has the lowest VFC. In the example shown in FIG. 9, the total VFCs of Blocks 1 and 2 are same (170). As a second step, the controller 102 can generate a sum of individual sub-blocks and compare them. Here, Block SB0+SB1 is 120 compared to Block 2 which is 130. Hence, the controller 102 would select Block 1 for garbage collection in this example.

FIG. 10 is a flow chart 1000 of a method of this embodiment. After the start (700) of the method, the controller 102 of the data storage device 100 determines if garbage collection is triggered (1010). If garbage collection is not triggered, the method ends (1015). If garbage collection is triggered, the controller 102 scans the garbage collection blocks in the pool and finds the sum of the VFCs of the individual sub-blocks (1020). The controller 102 then determines whether the VFC is equal among the blocks (1025). If the VFC count is not equal among the blocks, the controller 102 triggers garbage collection on the least total VFC block (1030). If the VFC is equal among the blocks, the controller 102 finds the sub-block pair with the least VFC (1035) and triggers garbage collection accordingly (1040, 1045, 1055), after which the method ends (1050).

There are several advantages associated with these embodiments. For example, these embodiments can be used to provide a more-optimal and less time-consuming garbage collection process for multi-tier (e.g., three tier) sub-block memories. Further, these embodiments can put a three-tier memory structure to good use without compromising its design. Also, these embodiments can be extended to accommodate more tiers for future BiCS specifications without compromising the design.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory comprising a plurality of blocks, each block configured to be partitioned into a plurality of sub-blocks; and
one or more processors, individually or in combination, configured to:
  determine a sum of valid fragment counts of a first grouping of sub-blocks;
  determine a sum of valid fragment counts of a second grouping of sub-blocks;
  determine which of the first and second groupings of sub-blocks has a lower sum of valid fragment counts; and
  perform garbage collection on whichever of the first and second groupings of sub-blocks that is determined to have the lower sum of valid fragment counts.

2. The data storage device of claim 1, wherein:
each block comprises an upper, middle, and lower sub-block;
the first grouping of sub-blocks comprises the upper and middle sub-block; and
the second grouping of sub-blocks comprises the middle and lower sub-blocks.

3. The data storage device of claim 1, wherein none of the plurality of sub-blocks comprise an unselected-sub-block-disturb (USBD) error.

4. The data storage device of claim 1, wherein one of the plurality of blocks has a dependency on another one of the plurality of blocks for an erase or program operation.

5. The data storage device of claim 1, wherein each sub-block of a given block occupies a single x-y location but is located in a different z location.

6. The data storage device of claim 1, wherein each sub-block of a given block is connected vertically to a same memory hole.

7. The data storage device of claim 1, wherein each sub-block of a given block comprises its own wordline zone.

8. The data storage device of claim 1, wherein each sub-block of a given block operates independently of other sub-blocks of the given block.

9. The data storage device of claim 1, wherein the memory comprises a three-dimensional memory.

10. In a data storage device comprising a memory comprising a plurality of blocks, each block configured to be partitioned into a plurality of sub-blocks, a method comprising:
for each block of the plurality of blocks, determining a sum of valid fragment counts of the plurality of sub-blocks in that block;
determining which block of the plurality of blocks has the lowest sum of valid fragment counts;
determining a sum of valid fragment counts of each of a plurality of sub-block groupings in the block of the plurality of blocks determined to have the lowest sum of valid fragment counts;
determining which sub-block grouping of the plurality of sub-block groupings has a lowest sum of valid fragment counts; and
performing garbage collection on the determined sub-block grouping.

11. The method of claim 10, wherein at least one of the plurality of sub-blocks comprise an unselected-sub-block-disturb (USBD) error.

12. The method of claim 10, further comprising:
choosing another sub-block grouping of the plurality of sub-block groupings as an immediate next candidate for garbage collection to maintain program-erase-count sync among the plurality of sub-blocks in the block of the plurality of blocks determined to have the lowest sum of valid fragment counts.

13. The method of claim 10, wherein:
each block comprises an upper, middle, and lower sub-block; and
the plurality of sub-block groupings comprises:
  a first sub-block grouping comprising the upper and middle sub-blocks; and
  a second sub-blocks grouping comprising the middle and lower sub-blocks.

14. The method of claim 10, further comprising:
performing garbage collection on only sub-block of the determined sub-block grouping; and
performing garbage collection on a left-over sub-block grouping.

15. The method of claim 10, further comprising:
determining that the plurality of blocks do not have equal valid fragment counts; and
performing garbage collection on whichever block of the plurality of blocks has a lowest sum of valid fragment counts.

16. The method of claim 10, wherein each sub-block of a given block occupies a single x-y location but is located in a different z location.

17. The method of claim 10, wherein each sub-block of a given block is connected vertically to a same memory hole.

18. The method of claim 10, wherein each sub-block comprises wear level logic.

19. The method of claim 10, wherein the memory comprises a three-dimensional memory.

20. A data storage device comprising:
a memory comprising a block configured to be partitioned into upper, middle, and lower sub-blocks; and
means for:
  performing garbage collection on whichever of the upper sub-block and the lower sub-block that has a greater valid fragment count; and
  grouping the middle sub-block with whichever of the upper sub-block and the lower sub-block that does not have the greater valid fragment count, wherein the grouping competes with other sub-block groupings and individual sub-blocks in the memory for a future garbage collection operation.

* * * * *